Patented Sept. 3, 1940

2,213,755

UNITED STATES PATENT OFFICE 2,213,755

PURIFICATION OF ANTHRACENE

John A. C. Yule, Rochester, N. Y., assignor to Eastman Kodak Company, Rochester, N. Y., a corporation of New Jersey No Drawing. Application April 13, 1938, Serial No. 201,801

5 Claims. (Cl. 202—41)

This invention relates to improvements in the purification of anthracene and, particularly, to a method for preparing anthracene having a bright blue-violet florescence.

Numerous methods are known for the preparation of anthracene for varying degrees of purity. Many such methods are decidedly expensive and difficult to carry out. The usual method of preparing anthracene with a pure blue-violet florescence, namely one which is free of chrysogen, is to expose a solution of anthracene to light which apparently polymerizes the chrysogen. This has the disadvantage that unless the anthracene is practically pure to start with a very long exposure to light is required, since the dark colored impurities absorb the actinic rays. Other methods give an unsatisfactory product. A simple and economical method of preparing pure anthracene particularly of such purity that it has good florescent properties, has been conspicuous by its absence.

This invention has for its object to provide an improved method for purifying anthracene. Another object is to provide an improved and economical method for preparing anthracene having good florescent properties. Other objects will appear hereinafter.

These and other objects are accomplished in accordance with my invention which, includes distilling the anthracene which is to be purified with a polyhydric alcohol having a boiling point in the neighborhood of about 200° C. The polyhydric alcohol distills with the anthracene, but is more or less insoluble therewith so that the two constituents can be readily separated from the condensate, particularly after it is chilled.

Almost any type of still, either batch or continuous, may be used for the distillation. For instance, a still pot heated by gas would be satisfactory. In order to avoid clogging of the condenser it is desirable to provide means for heating the condenser during the distillation to a temperature such that crystallization of the anthracene does not take place until the condensate has been removed therefrom. A temperature of about 150° at this point has been found to be satisfactory. The condenser in many cases can be air cooled and so adjusted as to length that condensate is removed therefrom before it has cooled to crystallization temperature. When a cooling fluid is employed to cool the condenser, it is usually necessary to warm or heat it to a slightly elevated temperature before circulating it through the condenser cooling jacket. Otherwise precipitation and clogging of the condenser will take place.

If the condenser temperature is properly regulated no crystallization will take place therein so that no special provision has to be made to handle anthracene crystals at this point. The problem of precipitation can also be controlled by regulating the amount of polyhydric alcohol used. Proportions of 10–20% by weight of anthracene are satisfactory in most cases and operation within this range will avoid clogging problems, especially if the condenser is operated in the manner described. I prefer to employ 13–17% and especially 15% by weight of anthracene.

The warm or hot condensate is passed into a large cooled chamber or other cooling zone maintained at a temperature sufficiently low to cause the anthracene to crystallize. The anthracene can then be separated from the alcohol using any one of a variety of methods obvious to those skilled in the art. At room temperature the solubility of the anthracene is very low and mere filtration at this temperature is usually sufficient. The anthracene crystals can be washed with volatile solvents capable of removing the residual polyhydric alcohol such as water or ethyl alcohol. The polyhydric alcohol can be very easily purified by diluting with water which precipitates impurities, such as carbazole. After filtering, the water may be distilled off and the alcohol used over again in the process.

The procedure can, of course, be carried out in a batch or continuous still. If a batch still is used a mixture of the polyhydric alcohol and solid crude anthracene is introduced into the still and treated as described. In operating in a continuous manner a hot solution of anthracene in the polyhydric alcohol is introduced into the still. For instance, when ethylene glycol is employed, a 16% hot solution in the glycol is run into the still at a rate corresponding to the rate of distillation.

The addition of a small amount of maleic anhydride to the mixture in the still improves the purification.

Any grade of anthracene may be employed as starting material. The procedure gives excellent results with practical anthracene of 80–85% purity. Where a highly impure starting material is used, redistillation with the polyhydric alcohol in the manner described may be necessary or advantageous to obtain a perfectly pure product. The impurities mainly remain in the residue after distillation, although some are carried over with the polyhydric alcohol and remain dissolved therein after the anthracene has been crystallized out.

Although ethylene glycol constitutes the preferred alcohol other polyhydric alcohols, such as for instance trimethylene glycol having a boiling point of 214° C., may be used. Trimethylene glycol effects a slightly less perfect removal of impurities but has the advantage that the anthracene comes off more rapidly and a higher percentage of anthracene may, therefore, be used in the original mixture. When using such an agent, redistillation to perfect the purification may be desirable.

The herein described invention constitutes a simple, economical and effective method for preparing anthracene in pure form. During distillation the temperature is automatically regulated by the boiling point of the polyhydric alcohol used and there is less danger of clogging the system with solid anthracene than in other prior art processes, such as steam distillation. The anthracene, of course, is maintained as a liquid or in solution due to its solubility in the hot polyhydric alcohol and blockage is, therefore, avoided.

What I claim is:

1. The process of purifying anthracene which comprises subjecting it to distillation in the presence of a polyhydric alcohol having a boiling point in the neighborhood of 200° C., condensing the mixed vapors of anthracene and polyhydric alcohol and separating the anthracene from the polyhydric alcohol.

2. The process of purifying anthracene which comprises adding ethylene glycol to the impure anthracene and subjecting the mixture to distillation, condensing the mixed vapors of anthracene and ethylene glycol and separating the anthracene from the condensate.

3. The process of purifying anthracene which comprises subjecting a mixture of 10–20% of the anthracene in a polyhydric alcohol having a boiling point in the neighborhood of 200° C. to distillation, condensing the mixed vapors of anthracene and polyhydric and separating the anthracene from the condensate.

4. The process of preparing pure anthracene having bright blue-violet florescence which comprises subjecting a mixture of 10–20% of the anthracene in ethylene glycol to distillation, condensing the mixed vapors of anthracene and ethylene glycol and separating the anthracene from the condensate.

5. The process of claim 4 in which a small amount of maleic anhydride is added to the anthracene-glycol mixture before distillation.

JOHN A. C. YULE.

CERTIFICATE OF CORRECTION.

Patent No. 2,213,755.

September 3, 1940.

JOHN A. C. YULE.

It is hereby certified that error appears in the printed specification of the above numbered patent requiring correction as follows: Page 1, first column, line 6, for the word "for" read --of--; page 2, second column, line 17, claim 3, after "polyhydric" insert --alcohol--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.